(12) United States Patent
Okazaki et al.

(10) Patent No.: US 12,338,375 B2
(45) Date of Patent: Jun. 24, 2025

(54) HOT MELT ADHESIVE COMPOSITION HAVING IMPROVED WET BONDING STRENGTH

(71) Applicant: BOSTIK SA, Colombes (FR)

(72) Inventors: Genta Okazaki, Osaka (JP); Xin Ye, Shanghai (CN)

(73) Assignee: BOSTIK SA, Colombes (FR)

( * ) Notice: Subject to any disclaimer, the term of this patent is extended or adjusted under 35 U.S.C. 154(b) by 247 days.

(21) Appl. No.: 17/998,296

(22) PCT Filed: May 4, 2021

(86) PCT No.: PCT/EP2021/061660
§ 371 (c)(1),
(2) Date: Nov. 9, 2022

(87) PCT Pub. No.: WO2021/239404
PCT Pub. Date: Dec. 2, 2021

(65) Prior Publication Data
US 2023/0235203 A1    Jul. 27, 2023

(30) Foreign Application Priority Data
May 27, 2020 (EP) .................................. 20176828

(51) Int. Cl.
| | |
|---|---|
| C09J 153/02 | (2006.01) |
| B32B 5/02 | (2006.01) |
| B32B 7/12 | (2006.01) |
| C09D 153/02 | (2006.01) |
| B32B 5/26 | (2006.01) |

(52) U.S. Cl.
CPC ............ *C09J 153/02* (2013.01); *B32B 5/022* (2013.01); *B32B 7/12* (2013.01); *C09D 153/02* (2013.01); *B32B 5/266* (2021.05); *B32B 2250/20* (2013.01); *B32B 2255/02* (2013.01); *B32B 2255/26* (2013.01); *B32B 2555/02* (2013.01); *B32B 2571/00* (2013.01)

(58) Field of Classification Search
CPC ...... C09J 153/02; C09D 153/02; C08L 53/02; C08L 2205/03; B32B 5/022; B32B 5/266; B32B 7/12; B32B 2250/20; B32B 2255/02; B32B 2255/26; B32B 2555/02; B32B 2571/00
See application file for complete search history.

(56) References Cited

U.S. PATENT DOCUMENTS

| | | | |
|---|---|---|---|
| 4,914,253 | A | 4/1990 | Chang |
| 6,319,979 | B1 | 11/2001 | Dubois et al. |
| 10,400,142 | B2 | 9/2019 | Ichikawa et al. |
| 2010/0210163 | A1 † | 8/2010 | He |
| 2016/0068721 | A1 † | 3/2016 | Malcolm |
| 2016/0068723 | A1 † | 3/2016 | Moriguchi |
| 2018/0100091 | A1 | 4/2018 | Sugimoto et al. |
| 2021/0054249 | A1 | 2/2021 | Park et al. |

FOREIGN PATENT DOCUMENTS

| | | | |
|---|---|---|---|
| EP | 3339390 | A1 | 6/2018 |
| EP | 3715433 | A1 † | 9/2020 |
| JP | 2004115667 | A | 4/2004 |
| JP | 2008239931 | A | 10/2008 |
| JP | 4436599 | B2 | 3/2010 |
| JP | 4848184 | A | 12/2011 |
| JP | 2015091917 | A | 5/2015 |
| WO | 9733921 | A1 | 9/1997 |
| WO | 9803603 | A1 | 1/1998 |
| WO | 2015002308 | A1 | 1/2015 |
| WO | 2015125546 | A1 | 8/2015 |
| WO | 2018074070 | A1 | 4/2018 |
| WO | 2019132322 | A1 | 7/2019 |

OTHER PUBLICATIONS

ISA/EP; International Search Report and Written Opinion for International Patent Application No. PCT/EP2021/061660 dated Jul. 28, 2021, 8 pages.

† cited by third party

*Primary Examiner* — Sheeba Ahmed
(74) *Attorney, Agent, or Firm* — NK Patent Law

(57) ABSTRACT

The invention relates to a hot melt adhesive composition comprising a polymer component, the polymer component comprising at least one styrene-butadiene-styrene block copolymer P having a styrene content from 35 to 50% by weight: a styrene-butadiene diblock content from 50 to 80% by weight; and a viscosity of a 15% by weight toluene solution at 25° C. of 20 to 40 mPa·s, and at least one styrene block copolymer other than a styrene-butadiene-styrene block copolymer, wherein said styrene-butadiene-styrene block copolymer P is at a content from 10 to 40% by weight relative to the total weight of the polymer component. The invention also relates to the use of said composition as an adhesive for bonding two substrates, and to articles comprising at least one interior or exterior surface coated with said composition.

17 Claims, No Drawings

US 12,338,375 B2

HOT MELT ADHESIVE COMPOSITION HAVING IMPROVED WET BONDING STRENGTH

CROSS-REFERENCE TO RELATED APPLICATIONS

This application is a U.S. National Stage application of International Patent Application No. PCT/EP2021/061660, filed on May 4, 2021, which claims the benefit of European Patent Application No. 20176828.0, filed on May 27, 2020.

TECHNICAL FIELD

The present invention relates to a styrene block copolymer-based hot melt adhesive composition and its use for adhering nonwoven materials.

TECHNICAL BACKGROUND

Hot melt adhesives (HM adhesives) are substances which are solid at room temperature and which often comprise neither water nor solvent. They are applied in the molten state after heating to a temperature generally of between 10° and 250° C., most often between 13° and 180° C., and solidify during cooling, thus forming a seal (or adhesive joint) which ensures the attachment of the two substrates to be assembled. Hot melt adhesives are generally provided in the form of compositions which comprise a thermoplastic polymer and optionally a tackifying resin and a plasticizer.

Hot melt adhesives are widely used in various applications, such as packaging, bookbinding and woodworking, as they have good stability and do not require the use of solvents. Such adhesives can also be used in nonwoven applications. For example, disposable nonwoven absorbent articles are widely used for infant, young child, incontinent adult and feminine care applications.

Typical disposable nonwoven absorbent articles include disposable diapers, training pants, adult incontinent pads and briefs, feminine sanitary napkins or pads, surgical masks. These items aim at receiving and containing body fluids and are usually worn against or in close proximity to the skin.

To manufacture disposable nonwoven absorbent articles, hot melt adhesive compositions are generally used to bond together various substrates of said articles, as they provide rapid bonding compared to other adhesives such as water-based or solvent-based adhesive compositions, which require a drying step of the water or solvent.

Hot melt adhesive compositions suitable for this purpose should possess the appropriate bond strength to adhere the substrates involved. More particularly such hot melt adhesives should present a high wet adhesion. By "wet adhesion" is meant the ability to strongly affix to a substrate material in the presence of moist environmental conditions. In order to increase the wet adhesion of a hot melt composition, acid-modified resins or waxes can be added. However, such compounds tend to generate an unpleasant odor and a darker color of the adhesive which can result in a lower quality product.

Document US 2018/0100091 relates to a hot melt adhesive comprising a styrenic block copolymer (A) containing a styrene-butadiene-styrene block copolymer (A1); and at least one styrenic block copolymer (A4), a tackifier (B); and a plasticizer (C), wherein the hot melt adhesive has a melt viscosity of 6000 mPa·s or lower.

Document JP 4436599 relates to a hot melt adhesive comprising a block copolymer, a pressure-sensitive adhesion imparting agent and a plasticizer. The block copolymer contains at least 30 wt % of a styrene-butadiene-styrene block copolymer having a styrene content from 35 to 50 wt. %, a styrene-butadiene diblock content from 50 to 80 wt. % and a viscosity from 20 to 40 mPa·s of a 15 wt. % solution in toluene at 25° C.

Document JP 2008239931 relates to a hot melt adhesive containing from 5 to 50% by weight of a styrene-butadiene-styrene triblock copolymer having a content of a styrene-butadiene di-block from 0 to 30% by weight and a content of styrene from 20 to 40% by weight.

Document JP 4848184 relates to a hot melt adhesive comprising a thermoplastic block copolymer which is a copolymer of a vinyl aromatic hydrocarbon and a conjugated diene compound, and a wax modified with a carboxylic acid and/or a carboxylic acid anhydride.

Document JP 2015091917 relates to a hot melt adhesive agent containing a thermoplastic block copolymer containing at least one kind of a block copolymer of vinyl aromatic hydrocarbon and a conjugated diene compound, and a hydrogenated product thereof and an acid modified petroleum resin manufactured by acid modification by unsaturated carboxylic acid or anhydride thereof.

Document WO 2015/002308 relates to a hot melt adhesive composition comprising a thermoplastic block copolymer (A) that comprises at least one component selected from the group consisting of a styrene-isoprene-styrene block copolymer and a styrene-butadiene/butylene-styrene block copolymer; a liquid rubber (B) having a carboxyl group and/or a carboxylic acid anhydride group in the molecule; and an adhesiveness-imparting resin (C).

Document WO 2015/125546 relates to a hot melt adhesive composition comprising a thermoplastic polymer and a tackifier, wherein the tackifier includes an acid-modified tackifier.

Document WO 2018/074070 relates to a hot melt adhesive composition that comprises a thermoplastic polymer, a tackifier, and a softener, wherein the softener includes an acid-modified oil modified by at least one of carboxylic acid and carboxylic acid anhydride.

There is still a need for a hot melt adhesive composition which provides good adhesion, notably a high wet bonding strength in particular in nonwoven material-based products.

SUMMARY OF THE INVENTION

It is a first object of the invention to provide a hot melt adhesive composition comprising a polymer component, the polymer component comprising:
  at least one styrene-butadiene-styrene block copolymer P having:
    a styrene content from 35 to 50% by weight;
    a styrene-butadiene diblock content from 50 to 80% by weight;
    and
    a viscosity of a 15% by weight toluene solution at 25° C. of 20 to 40 mPa·s;
  at least one styrene block copolymer other than a styrene-butadiene-styrene block copolymer;
  wherein said styrene-butadiene-styrene block copolymer P is at a content from 10 to 40% by weight relative to the total weight of the polymer component.

According to some embodiments, the styrene-butadiene-styrene block copolymer P is at a content from 10 to 35% by weight, preferably from 10 to 30% by weight, more preferably from 10 to 28% by weight and more preferably from 10 to 25% by weight relative to the total weight of the polymer component.

According to some embodiments, the at least one styrene block copolymer other than a styrene-butadiene-styrene block copolymer is chosen from styrene-butadiene, styrene-isoprene-styrene, styrene-isoprene, styrene-isoprene-butadiene-styrene, styrene-ethylene-butylene-styrene, styrene-ethylene-butylene, styrene-ethylene-propylene-styrene, styrene-ethylene propylene, styrene-ethylene-ethylene-propylene-styrene copolymers, and mixtures thereof.

According to some embodiments, the at least one styrene block copolymer other than a styrene-butadiene-styrene is a styrene-isoprene-styrene block copolymer.

According to some embodiments, the at least one styrene block copolymer other than a styrene-butadiene-styrene is at a content from 0.1 to 60% by weight, preferably from 1 to 30% by weight, more preferably from 2 to 20% by weight and even more preferably from 5 to 15% by weight relative to the total weight of the polymer component.

According to some embodiments, the polymer component comprises:
- from 40 to 85 wt. %, and preferably from 50 to 80 wt. %, of at least one styrene-butadiene-styrene block copolymer different from the styrene-butadiene-styrene block copolymer P;
- from 1 to 20 wt. %, preferably from 5 to 15 wt. % of a styrene-isoprene-styrene block copolymer.

According to some embodiments, the composition is devoid of a resin, wax or oil modified by an unsaturated polycarboxylic acid, anhydride or ester.

According to some embodiments, the composition has a viscosity from 1 000 to 30 000 mPa·s and preferably from 5 000 to 20 000 mPa·s at a temperature of 120° C.

According to some embodiments, the total amount of polymer component is from 10% to 80% by weight, more preferably from 15% to 45% by weight, and even more preferably from 15% to 35% by weight, relative to the total weight of the hot melt adhesive composition.

According to some embodiments, the composition further comprises from 45 to 75% of a tackifying resin relative to the total weight of the composition, and/or from 5 to 25% of a plasticizer relative to the total weight of the composition, and/or from 0.1 to 5% of a stabilizer relative to the total weight of the composition, and/or from 0 to 30% of a wax relative to the total weight of the composition.

The invention also relates to the use of the composition described above, as an adhesive for bonding two substrates together, or as a coating on the surface of a substrate.

The invention also relates to an article comprising at least one interior or exterior surface coated with the hot melt adhesive composition described above.

According to some embodiments, the interior or exterior surface is a nonwoven fabric.

According to some embodiments, the article is chosen from a disposable diaper, disposable training pants, a feminine sanitary napkin, an adsorbent pad, a surgical mask, and a surgical coat.

The present invention makes it possible to address the need mentioned above. In particular the invention provides a hot melt adhesive composition which provides good adhesion, notably a high wet bonding strength in particular in nonwoven material-based products.

This is made possible with the hot melt adhesive composition of the present invention. In fact, this composition affords high wet adhesion and also high dry adhesion which makes it possible to provide non-woven-based articles of good quality.

Advantageously, the composition of the present invention can be devoid of an acid-modified resin, wax or oil. Thus, problems related to an unpleasant odor and/or a darker color of the adhesive can be limited.

DESCRIPTION OF EMBODIMENTS

The invention will now be described in more detail without limitation in the following description.

The hot melt adhesive composition of the present invention comprises a polymer component and may also comprise other additional components.

The term "hot melt" is used herein to describe that the adhesive composition requires to be heated at at least 120° C., and preferably at least 140° C., to be applied on a substrate. The hot melt adhesive composition is thus solid at 23° C.

Polymer Component

The polymer component of the hot melt adhesive composition comprises at least one styrene-butadiene-styrene (SBS) block copolymer P having the following properties: a styrene content from 35 to 50% by weight; a styrene-butadiene diblock content from 50 to 80% by weight; and a viscosity of a 15% by weight toluene solution at 25° C. of 20 to 40 mPa·s.

The "styrene content" refers to the ratio of the styrene block contained in the SBS block copolymer. The styrene content is from 35 to 50% by weight, more preferably from 35 to 45% by weight, and particularly preferably from 40 to 45% by weight. When the styrene content rate is less than 35% by weight, the holding power (cohesion) of the hotmelt adhesive itself can be reduced, and when the styrene content rate exceeds 50% by weight, the tackiness of the hotmelt adhesive itself can be reduced.

The "diblock content" refers to the ratio of the styrene-butadiene diblock copolymer in the SBS block copolymer. The diblock content is from 50 to 80% by weight, more preferably 55 to 75% by weight, and particularly preferably from 60 to 70% by weight. When the diblock content is less than 50% by weight, the tackiness can be poor. In particular, when a load is applied in the shear direction at a high temperature, the hotmelt adhesive tends to be detached from the substrate at its interface because of poor tackiness. When the diblock content exceeds 80% by weight, the holding power (cohesion) and the adhesion at a high temperature of the hotmelt adhesive can be reduced. The "viscosity of a 15% by weight toluene solution at 25° C." refers to the viscosity of a solution having a concentration of 15% by weight using toluene as a solvent at 25° C. The viscosity is measured by using a Brookfield viscometer. The viscosity of a 15 wt % toluene solution of the SBS block copolymer at 25° C. is from 20 to 40 mPa·s, and more preferably from 20 to 35 mPa·s. When this viscosity is less than 20 mPa·s, the molecular weight of the SBS block copolymer is low. Therefore, the polymer is hardly solidified when producing the SBS block copolymer, that is, the softening point can be low when it is formed into a hot melt adhesive, and blocking can be caused in its production line or caused by cold flow after being molded. When this viscosity is more than 40 mPa·s, the viscosity of the hot melt adhesive itself is high and it can hardly be applied. In particular, non-contact application can be difficult at a low temperature.

The SBS block copolymer P may be hydrogenated or not. According to preferred embodiments, the SBS block copolymer is not hydrogenated.

According to some embodiments, the SBS block copolymer P has a melt index (MFI) of less than 150 grams/10 minutes, more preferably less than 100 grams/10 minutes, and more preferably less than 60 grams/10.

The MFI may be measured by ASTMD 1238 or ISO1133 at 190° C. or 200° C. (preferably 190° C.) under a load of 5 kg. The SBS block copolymer P is present in an amount from 10 to 40% by weight, relative to the total weight of the polymer component. Preferably, the SBS block copolymer may be present in an amount from 10 to 35% by weight, preferably from 10 to 30% by weight, more preferably from 10 to 28% by weight and more preferably from 10 to 25% by weight relative to the total weight of the polymer component.

For example, the SBS block copolymer P may be present in an amount from 10 to 15% by weight, or from 15 to 20% by weight, or from 20 to 25% by weight, or from 25 to 30% by weight, or from 30 to 35% by weight, or from 35 to 40% by weight relative to the total weight of the polymer component.

According to some embodiments, the hot melt adhesive composition, and more particularly the polymer component comprises one SBS block copolymer P as described above.

According to other embodiments, the hot melt adhesive composition, and more particularly the polymer component comprises more than one SBS block copolymer P as described above, for example, two, or three, or four, or five or more than five SBS block copolymer P as described above.

In addition to the at least one SBS block copolymer P described above, the polymer component may also comprise another SBS block copolymer, not according to the above definition. In other words, the polymer component may comprise a SBS block copolymer which has a styrene content other than 35 to 50% by weight, and/or a styrene-butadiene diblock content other than 50 to 80% by weight, and/or a viscosity of a 15% by weight toluene solution at 25° C. other than 20 to 40 mPa·s.

The addition of such polymer in the hot-melt adhesive composition makes it possible to increase the cohesion of the composition. This SBS block copolymer different from the copolymer P may preferably be present in the polymer component in an amount from 40 to 85%, and more preferably from 50 to 80% by weight relative to the total weight of the polymer component.

In other embodiments, the polymer component of the hot melt adhesive composition does not comprise any SBS block copolymer other than the SBS block copolymer(s) P defined and described above.

The polymer component also comprises at least one styrene block copolymer other than a styrene-butadiene-styrene block copolymer. They are available in a number of different chemical types and structure types. Examples of the styrene block copolymers (SBC) that may be used in the hot melt adhesive composition of the present invention (aside from the SBS block copolymer P) include styrene-butadiene (SB), styrene-isoprene-styrene (SIS), styrene-isoprene (SI), styrene-isoprene-butadiene-styrene (SIBS), styrene-ethylene butylene-styrene (SEBS), styrene-ethylene-butylene (SEB), styrene-ethylene-propylene-styrene (SEPS), styrene-ethylene propylene (SEP) and styrene-ethylene-ethylene-propylene-styrene (SEEPS or hydrogenated SIBS).

The addition of such polymer in the composition according to the invention makes it possible to improve the softness of the hot-melt adhesive composition and also its adhesion, notably at low temperatures.

According to preferred embodiments, the styrene block copolymer other than a SBS block copolymer comprises a SIS block copolymer.

According to some embodiments, only one styrene block copolymer other than a SBS block copolymer is present in the polymer component of the hot melt adhesive composition of the present invention. It is preferably a SIS block copolymer.

According to other embodiments, more than one (for example, two, or three, or four, or five or more than five) styrene block copolymers other than a SBS block copolymer are present in the polymer component of the hot melt adhesive composition of the present invention.

The styrene content of the styrene block copolymer other than a SBS block copolymer may for example be from 5 to 50% by weight, more preferably from 10 to 40% by weight, and particularly preferably from 10 to 30% by weight. The viscosity of a 15 wt % toluene solution of styrene block copolymer other than a SBS block copolymer at 25° C. is from 50 to 2 000 mPa·s, and more preferably from 50 to 1 000 mPa·s. The viscosity is measured by using a Brookfield viscometer. The styrene block copolymer other than a SBS block copolymer may preferably be present in an amount from 0.1 to 60% by weight, preferably from 1 to 30% by weight, more preferably from 2 to 20% by weight, and even more preferably from 5 to 15% by weight relative to the total weight of the polymer component.

The total amount of polymer component used according to the invention preferably ranges from 10% to 80% by weight, more preferably from 15% to 45% by weight, and even more preferably from 15% to 35% by weight, relative to the total weight of the hot melt adhesive composition.

Hot Melt Adhesive Composition

Apart from the polymer component, the hot melt adhesive composition may comprise one or more additional components. Such additional components can be chosen from a tackifying resin, a plasticizer, a wax, a stabilizer and other additives.

According to some embodiments, the hot melt adhesive composition preferably comprises a tackifying resin. The tackifying resin can be present in the hot melt adhesive composition at a content of 45 to 75% by weight, and preferably from 50 to 70% by weight relative to the total weight of the hot melt adhesive composition.

The tackifying resins or tackifiers which are used in the hot melt adhesives of the present invention are those which are compatible with the polymers and extend adhesive properties and improve specific adhesion. As used herein, the term "tackifying resin" or "tackifier" include:
 (a) Aliphatic and cycloaliphatic petroleum hydrocarbon resins having Ring and Ball softening points from 95° C. to 160° C. as determined by ASTM method E28-58T, the latter resins resulting from the polymerization of monomers consisting primarily of aliphatic and/or cycloaliphatic olefins and diolefins; also included are the hydrogenated aliphatic and cycloaliphatic petroleum hydrocarbon resins, examples of such commercially available resins based on a C5 olefin fraction of this type are Piccotac 95 tackifying resin sold by Hercules Corp. and Escorez 1310LC sold by Exxon-Mobil Chemical Company;
 (b) Aromatic petroleum hydrocarbon resins and the hydrogenated derivatives thereof;

(c) Aliphatic/aromatic petroleum derived hydrocarbon resins and the hydrogenated derivatives thereof;
(d) Aromatic modified cycloaliphatic resins and the hydrogenated derivatives thereof;
(e) Polyterpene resins having a softening point from 95° C. to 140° C. the latter polyterpene resins generally resulting from the polymerization of terpene hydrocarbons, such as the mono-terpene known as pinene, in the presence of Friedel-Crafts catalysts at moderately low temperatures; the hydrogenated polyterpene resins are also included;
(f) Copolymers and terpolymers of natural terpenes, e.g. styrene/terpene, α-methyl styrene/terpene and vinyl toluene/terpene;
(g) Natural and modified rosin such as, for example, gun rosin, wood rosin, tall-oil rosin, distilled rosin, hydrogenated rosin, dimerized rosin and polymerized rosin;
(h) Glycerol and pentaerythritol esters of natural and modified rosin, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall-oil rosin, and the phenolic modified pentaerythritol ester of rosin;
(i) Phenolic-modified terpene resins such as for example, the resin product resulting from the condensation in an acidic medium of a terpene and a phenol.

In preferred embodiments, the resin is not modified by an unsaturated polycarboxylic acid, anhydride or ester (in other words, the composition does not comprise any resin modified by an unsaturated polycarboxylic acid, anhydride or ester).

Mixtures of two or more of the above described tackifying resins may also be used.

Tackifying resins which are useful for the present invention can include polar tackifying resins. However, the choice of available polar tackifying resins is limited in view of the fact that many of the polar resins appear only partially compatible with polyolefin polymers.

Alternatively, the tackifying resins can be selected from any of the nonpolar types, which are commercially available. One class of preferred resins are aliphatic petroleum hydrocarbon resins, examples of which are based on C5 olefins. Most preferred are nonpolar products which are hydrogenated di-cyclo-pentadiene (DCPD) based or aromatically modified derivatives thereof with softening points above 95° C. Examples of such resins are Escorez 5340, Escorez 5400 and Escorez 5600 sold by ExxonMobil Chemical company.

Preferably, the tackifying resin should have a Ring and Ball softening point (measured by ASTM E28) of at least 95° C. and preferably from 95° C. to 140° C. In general, the tackifying resin should be substantially aliphatic to insure compatibility between the resin and the polyolefin polymers.

In addition, a plasticizer is preferably present in the hot melt adhesive composition. More particularly, a solid or liquid plasticizer can be present in the composition of the present invention.

In preferred embodiments, the plasticizer is not modified by an unsaturated polycarboxylic acid, anhydride or ester (in other words, the composition does not comprise any plasticizer modified by an unsaturated polycarboxylic acid, anhydride or ester).

The plasticizer may be present in the hot melt adhesive composition at a content from 5 to 25% by weight, and preferably from 10 to 23% by weight relative to the weight of the composition.

The purpose of the plasticizer is to provide a desired viscosity control and to impart flexibility. A suitable plasticizer may be selected from the group which includes the usual plasticizing oils, such as mineral oils, but also olefin oligomers and low molecular weight polymers, as well as vegetable and animal oils and derivatives of such oils. The petroleum derived oils which may be employed are relatively high boiling materials containing only a minor proportion of aromatic hydrocarbons. The oligomers may be polypropylenes, polybutenes, hydrogenated polyisoprenes, hydrogenated polybutadienes, or the like having an average molecular weight between 350 and 10,000. Suitable vegetable and animal oils include glycerol esters of the usual fatty acids and polymerization products thereof. The plasticizers that are useful in the present invention can be any number of different plasticizers but mineral oils and liquid polybutenes having an average molecular weight less than 5,000 are particularly advantageous.

Typically, plasticizers are used to lower the viscosity of the overall hot melt adhesive composition without substantially decreasing the adhesive strength and/or service temperature of the adhesive composition as well as to extend the open time and to improve flexibility of the composition The composition according to the present invention also preferably includes at least one stabilizer. The stabilizer may be present in the hot melt adhesive composition at a content from 0.1 to 5% and preferably from 0.5 to 3% by weight relative to the weight of the composition. The stabilizers which are useful in the hot melt adhesive composition of the present invention are incorporated to help protect the polymers noted above, and thereby the total adhesive system from the effects of thermal and oxidative degradation which normally occurs during the manufacture and application of the adhesive, as well as in the ordinary exposure of the final product to the ambient environment.

Among the applicable stabilizers are high molecular weight hindered phenols and multifunction phenols, such as sulfur and phosphorous-containing phenols. Hindered phenols are well known to those skilled in the art and may be characterized as phenolic compounds that also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxy-benzyl)benzene; pentaerythritol tetrakis-3 (3,5-di-tert-butyl-4-hydroxyphenyl) propionate; n-octadecyl-3 (3,5-di-tert-butyl-4-hydroxyphenyl) propionate, 4,4'-methylenebis(4-methyl-6-tert-butylphenol); 2,6-di-tert-butylphenol; 6-(4-hydroxyphenoxy)-2,4-bis(n-octylthio)-1,3,5-triazine; 2,3,6-tris(4-hydroxy-3,5-di-tert-butyl-phenoxy)-1,3,5-triazine; di-n-octadecyl-3,5-di-tert-butyl-4-hydroxybenzylphosphonate; 2-(n-octyl-thio) ethyl-3,5-di-tert-butyl-4-hydroxybenzoate and sorbitol hexa-3 (3,5-di-tert-butyl-4-hydroxy-phenyl) propionate.

Especially preferred as a stabilizer is pentaerythritol tetrakis-3 (3,5-di-tert-butyl-4-hydroxyphenol) propionate.

The performance of these stabilizers may be further enhanced by utilizing, in conjunction therewith; (1) synergists such as, for example, thiodipropionate esters and phosphites; examples of these include dialuryl thiodipropionate (DLTDP) and tris(nonylphenyl)phosphite (TNPP), respectively; and (2) chelating agents and metal deactivators as, for example, ethylenediaminetetraacitic acid, salts thereof and disalicylalpropylenediimine.

The composition according to the present invention may further include at least one wax. The wax may be present in the hot melt adhesive composition at a content from 0 to 30% and preferably from 0.5 to 3% by weight relative to the weight of the composition.

The presence of the wax makes it possible to reduce the melt viscosity of the hot melt adhesive without appreciably decreasing its adhesive bonding characteristics. These waxes are also used to reduce the open time, or set-up time of the composition without affecting the temperature performance.

Among useful wax materials are:
(1) low molecular weight, that is, number average molecular weight (Mn) from 100 to 6000 g/mol, polyethylene wax having a hardness value, as determined by ASTM method D-1321, from 0.1 to 120 and ASTM softening points from 65° C. to 140° C.;
(2) petroleum waxes such as paraffin wax having a melting point from 50° C. to 80° C. and microcrystalline wax having a melting point from 55° C. to 100° C., the latter melting points being determined by ASTM method D127-60;
(3) metallocene catalyzed propylene-based wax like those commercialized by Clariant under the name "Licocene";
(4) metallocene catalyzed wax or single-site catalyzed wax like for example those described in U.S. Pat. Nos. 4,914,253, 6,319,979, WO 97/33921 or WO 98/03603,
(5) synthetic waxes made by polymerizing carbon monoxide and hydrogen such as Fischer-Tropsch wax; and
(6) polyolefin waxes. As used herein, the term "polyolefin wax" refers to those polymeric or long-chain entities comprised of olefinic monomer units. These materials are commercially available from Westlake Chemical Co. under the trade name "Epolene".

In preferred embodiments, the wax is not modified by an unsaturated polycarboxylic acid, anhydride or ester (in other words, the composition does not comprise any wax modified by an unsaturated polycarboxylic acid, anhydride or ester).

Preferably, the wax materials used have a Ring and Ball softening point from 93° C. to 177° C. As should be understood, each of these waxes is solid at room temperature. Other useful substances include hydrogenated animal, fish and vegetable fats and oils such as hydrogenated tallow, lard, soy oil, cottonseed oil, castor oil, menhadin oil, cod liver oil, and the like, and which are solid at ambient temperature by virtue of their being hydrogenated, have also been found to be useful with respect to functioning as a wax material equivalent. These hydrogenated materials are often referred to in the adhesives industry as "animal or vegetable waxes".

According to some embodiments, other optional auxiliary additives may be incorporated in the hot melt adhesive composition, in order to modify one or more physical properties of the composition. These auxiliary additives may be present in the hot melt adhesive composition at a total amount from 0.01 to 3% by weight relative to the weight of the composition.

Such additives may include, for example, inert colorants such as titanium dioxide as well as fillers, surfactants, other types of polymers, crosslinking agents, nucleating agents, reactive compounds, fire-retardant mineral or organic agents, ultraviolet (UV) or infrared (IR) light absorbing agents, and UV or IR fluorescing agents. Typical fillers include talc, calcium carbonate, clay, silica, mica, wollastonite, feldspar, aluminum silicate, alumina, hydrated alumina, glass microspheres, ceramic microspheres, thermoplastic microspheres, baryte and wood flour. These optional auxiliary additives are well known in this art.

According to preferred embodiments, the composition of the present invention is devoid of an acid-modified component. Such compounds may include for example a wax, a resin (for example a petroleum or a tackifier resin), a softening agent, an oil, a plasticizer or a rubber. In other words, the composition of the present invention is devoid of a component modified by an unsaturated polycarboxylic acid, anhydride or ester (therefore comprising one or more acidic groups). Examples of polycarboxylic acids include maleic acid, fumaric acid, itaconic acid, citraconic acid and polycarboxylic acid.

The absence of such compounds makes it possible to limit or avoid problems related to an unpleasant odor and/or a darker color of the adhesive. In fact, the present invention makes it possible to obtain a composition which is devoid of such compounds and maintains a high wet adhesion and also a good dry adhesion.

According to some embodiments, the hot melt adhesive composition may comprise from 10 to 40% by weight of the SBS block copolymer P relative to the total weight of the polymer component, and from 0.1 to 30% by weight of a styrene block copolymer other than the SBS block copolymer P (for example a SIS block copolymer) relative to the total weight of the polymer component and from 40 to 85% by weight of a SBS block copolymer different from the copolymer P relative to the total weight of the polymer component.

The composition of the present invention may have a viscosity from 1 000 to 30 000 mPa·s and preferably from 5 000 to 20 000 mPa·s at a temperature of 120° C. The viscosity can be measured according to the ASTM D3236 standard in a Brookfield RVT viscometer (spindle #27). The composition of the present invention may have a softening point from 65 to 100° C., and preferably from 70 to 85° C. The softening point can be measured according to the ASTM E-28 standard.

The composition of the present invention makes it possible to achieve an average wet peel strength equal to or higher than 0.4 N, preferably equal to or higher than 0.6 N, and preferably equal to or higher than 0.8 N. Wet peel strength is measured as indicated below:

The composition is first heated at a temperature from 140 to 160° C. and is then applied to a primary substrate which is a hydrophilic spunbond non-woven fabric at 3 g/m$^2$ coating weight by Omega application with 0.3 seconds open time and 0.01 MPa compression at the nip rolls. The pattern of the hot-melt adhesive composition has a width of 15 mm. A secondary substrate (hydrophilic spunbond non-woven fabric) is then laminated with the primary substrate comprising the composition.

The laminate is then stored at 23° C. under an atmosphere of 50% relative humidity for 24 hours to cool and solidify the hot melt adhesive. The laminate is then cut in order to obtain test specimens having a width of 40 mm and a length of 75 mm. The test specimen is immersed in water at 23° C. for 5 sec and the wet test specimen is obtained by wiping off water. After that, the T-peel test is performed by pulling apart the wet test specimen at a rate of 300 mm/min at 23° C. and the wet peel strength is measured.

The composition of the present invention makes it possible to achieve an average dry peel strength equal to or higher than 0.2 N, preferably equal to or higher than 0.4 N, and preferably equal to or higher than 0.6 N. Dry peel strength is measured as indicated below:

The composition is first heated at a temperature from 140 to 160° C. and is then applied to a primary substrate which is a hydrophilic spunbond non-woven fabric at 3 g/m² coating weight by Omega application with 0.3 seconds open time and 0.01 MPa compression at the nip rolls. The pattern of the hot-melt adhesive composition has a width of 15 mm. A secondary substrate (hydrophilic spunbond non-woven fabric) is then laminated with the primary substrate comprising the composition.

The laminate is then stored at 23° C. under an atmosphere of 50% relative humidity for 24 hours to cool and solidify the hot melt adhesive. The laminate is then cut in order to obtain test specimens having a width of 40 mm and a length of 75 mm. The T-peel test is performed by pulling apart the test specimen at a rate of 300 mm/min at 23° C. and dry peel strength is measured.

Use

The invention also relates to the use of the hot melt adhesive composition as described above, for coating a substrate or for bonding two substrates together.

Each substrate to be coated or bonded may comprise a film, nonwoven material or woven material. It may comprise absorbent fluff, super absorbent polymer (SAP), composite material, plastics which may be elastomeric or non-elastomeric, for example styrene block copolymers (SBC), polyurethane, and polyolefin, and any mixture thereof. Preferably, the substrate is a nonwoven fabric.

In this case, the process of manufacturing an assembly product (or laminate) may comprise:
- a step (i) of heating the hot melt adhesive composition according to the invention, e.g. at a temperature ranging from 120° C. to 180° C., for at least a period of time long enough to render the hot melt adhesive composition liquid enough to be applied on a substrate (for example at least two hours), then
- a step (ii) of coating said composition on a first substrate, then
- a step (iii) of putting into contact the coated surface of the first substrate with the surface of a second substrate, so as to form an adhesive joint bonding the two substrates.

The invention also relates to the use of the hot melt adhesive composition as described above, for bonding two substrates.

The substrates may be different or of the same nature, with various forms (layer or film, strands, fluff).

Preferably, at least one of the substrates, and more preferably both substrates are nonwoven fabrics.

According to another aspect, the invention relates to an article comprising at least one interior or exterior surface coated with the hot melt adhesive composition as described above. In particular embodiments, the present invention relates to an assembly product comprising at least two substrates bonded by at least one hot melt adhesive composition according to the invention.

The coated surface and the bonded substrates may be as described above.

The hot melt adhesive composition according to the invention may be used as the laminating adhesive to bind a plurality of substrate layers for example to manufacture toilet tissues, paper towels, wipes and other consumer products, particularly absorbent articles such as disposable hygiene products, and more particularly disposable diapers.

In some embodiments, the assembly product according to the invention may be a multilayer product comprising at least two layers of substrate(s) bonded by at least one hot melt adhesive composition according to the invention.

In the assembly product according to the invention, the at least two layers of substrate(s) may be joined adhesively by a layer of the hot melt adhesive composition according to the invention, sandwiched between the two layers of substrate(s).

Alternatively or cumulatively, the at least two layers of substrate(s) may be adhesively joined by spots of the hot melt adhesive composition according to the invention.

Preferably, the article/assembly product is a disposable nonwoven absorbent article. Mention can be made of disposable diapers, disposable training pants, disposable adult incontinent pads or briefs and disposable feminine sanitary napkins or pads, surgical masks and surgical coats.

EXAMPLES

The following examples illustrate the invention without limiting it.

Fourteen compositions were prepared in order to study the wet peel strength and the dry peel strength. Compositions A to H are according to the invention while compositions I to N are comparative compositions. The compositions A to N comprise some of the following compounds:

SBS1: LCY Globalprene™ 3545 available from LCY. Linear SBS having a styrene content of 45%, a diblock content of 65% and a viscosity of a 15% by weight toluene solution at 25° C. of 30 mPa·s (corresponding to a block copolymer P).

SBS2: Taipol® 4270 available from TSRC. Linear SBS having a styrene content of 37%, a diblock content of 70% and an MFI of 20.5 g/10 min (190° cx5 kg) (corresponding to a block copolymer other than P). This polymer has a viscosity of a 15% by weight toluene solution at 25° C. of 43.5 mPa·s. The viscosity measurement was done with Spindle No. 21.

SBS3: Asaprene™ T-439 available from Asahi. Linear SBS having a styrene content of 45%, a diblock content of 65% and a viscosity of a 15% by weight toluene solution at 25° C. of 25 mPa·s (corresponding to a block copolymer P).

SBS4: Asaprene™ T-438 available from Asahi. Linear SBS having a styrene content of 35%, a diblock content of 70% and a viscosity of a 15% by weight toluene solution at 25° C. of 47.5 mPa·s (corresponding to a block copolymer other than P).

SIS: SIS 1126 available from Sinopec. Linear SIS having a styrene content of 16%, a diblock content of 50% and a viscosity of a 25% by weight toluene solution at 25° C. of 900 mPa·s.

R1: Quintone® D295 available from Zeon. Acid-modified non-hydrogenated petroleum resin. This resin is modified with maleic acid and has a softening point of 94° C. and an acid value of 8.0 mg KOH/g.

R2: Non-acid modified hydrogenated resin, Arkon M-100: Partially Hydrogenated C9 petroleum resin with a softening point of 100° C. available from Arakawa Chemical;

R3: Non-acid modified hydrogenated resin, I marv P-100: Fully hydrogenated DCPD/C9 petroleum resin with a softening point of 100° C. available from Idemitsu Kosan;

R4: Non-acid modified hydrogenated resin, FD100: Partially Hydrogenated C9 petroleum resin with a softening point of 100° C. available from FUCC;

R5: Non-acid modified hydrogenated resin, HD1100: Fully Hydrogenated DCPD petroleum resin with a softening point of 100° C. available from Luhua;

R6: Non-acid modified hydrogenated resin, FM100: Partially Hydrogenated C9 petroleum resin with a softening point of 100° C. available from FUCC;

R7: Non-acid modified hydrogenated resin, HB103: Hydrogenated DCPD/C9 petroleum resin with a softening point of 100° C. available from JXTG;

R8: Non-acid modified hydrogenated resin, Escorez™ 5600: Hydrogenated DCPD/C9 petroleum resin with a softening point of 100° C. available from ExxonMobil Chemical.

P1: paraffinic oil plasticizer, Diana Fresia S32 available from Idemistu

P2 paraffinic oil plasticizer, Apar Poweroil H350 available from Apar.

P3: naphthenic oil plasticizer. N4010 available from Karamay.

A1: Antioxidant Evernox® 10 available from Everspring.

| Compositions | A (inv.) | B (inv.) | C (inv.) | D (inv.) | E (inv.) | F (inv.) | G (inv.) | H (inv.) |
|---|---|---|---|---|---|---|---|---|
| SBS1 (%) | 4 | 4 | 3.9 | 3.9 | 4.5 | 4.5 | 2 | 8 |
| SBS2 (%) | 14 | 14 | 13.4 | 13.4 | 15.5 | 15.5 | 16 | 10 |
| SIS (%) | 2 | 2 | 1.9 | 1.9 | 2.2 | 2.2 | 2 | 2 |
| R1 (%) | — | — | 3 | 3 | — | 3 | — | — |
| R4 (%) | 30 | 30 | 30 | 30 | 30 | 30 | 30 | 30 |
| R5 (%) | 19.5 | 19.5 | 18.1 | 18.1 | 18.1 | 15.1 | 19.5 | 19.5 |
| R6 (%) | 10 | — | 10 | 10 | 10 | 10 | — | — |
| R7 (%) | — | 10 | — | — | — | — | 10 | 10 |
| P2 (%) | 15 | 20 | 19.2 | 14.4 | 19.2 | 19.2 | 20 | 20 |
| P3 (%) | 5 | — | — | 4.8 | — | — | — | — |
| A1 (%) | 0.5 | 0.5 | 0.5 | 0.5 | 0.5 | 0.5 | 0.5 | 0.5 |

| Compositions | I (comp.) | J (comp.) | K (comp.) | L (comp.) | M (comp.) | N (comp.) |
|---|---|---|---|---|---|---|
| SBS1 (%) | — | — | 18 | — | 6 | 2 |
| SBS2 (%) | — | — | — | 19.4 | 12 | 16 |
| SBS3 (%) | 9.56 | 9.56 | — | — | — | — |
| SBS4 (%) | 9.56 | 9.56 | — | — | — | — |
| SIS (%) | — | — | 2 | 6.3 | 2 | 2 |
| R2 (%) | 51.63 | 51.63 | — | — | — | — |
| R3 (%) | 9.56 | 9.56 | — | — | — | — |
| R4 (%) | — | — | 30 | — | 30 | 30 |
| R5 (%) | — | — | 19.5 | — | 19.5 | 19.5 |
| R7 (%) | — | — | 10 | — | 10 | 10 |
| R8 (%) | — | — | — | 48.8 | — | — |
| P1 (%) | 19.12 | — | — | — | — | — |
| P2 (%) | — | 19.12 | 20 | — | 20 | 20 |
| P3 (%) | — | — | — | 25 | — | — |
| A1 (%) | 0.6 | 0.6 | 0.5 | 0.5 | 0.5 | 0.5 |

The compositions A to N were prepared by placing the components listed in the table above into a jacketed mixing kettle equipped with a heater and a stirrer, and then mixed while heating at 170° C. for 120 min under vacuum to remove any entrapped air.

The viscosity of the compositions A to N was measured according to the ASTM D3236 standard in a Brookfield RVT viscometer.

The softening point of the compositions A to N was measured according to the ASTM E-28 standard.

The results are disclosed in the table below:

| Compositions | Viscosity (mPa · s) at 120° C. | Softening point (° C.) |
|---|---|---|
| A (inv) | 6975 | 74.4 |
| B (inv) | 6250 | 77.0 |
| C (inv) | 6375 | 75.9 |
| D (inv) | 7100 | 75.3 |
| E (inv) | 9600 | 82.8 |
| F (inv) | 9775 | 81.8 |
| G (inv) | 6300 | 76.9 |
| H (inv) | 6500 | 77.8 |
| I (comp) | 5050 | 83.8 |
| J (comp) | 7475 | 90.2 |
| K (comp) | 6275 | 77.1 |
| L (comp) | 18650 | 89.0 |
| M (comp) | 6025 | 77.7 |
| N (comp) | 5200 | 77.4 |

The average dry peel strength and wet peel strength were measured as detailed in the above description.

| Compositions | Wet peel strength (N) | Dry peel strength (N) |
|---|---|---|
| A | 0.41 | 0.34 |
| B | 0.52 | 0.49 |
| C | 0.54 | 0.38 |
| D | 0.40 | 0.29 |
| E | 0.53 | 0.32 |
| F | 0.44 | 0.32 |
| G | 0.40 | 0.34 |
| H | 0.42 | 0.55 |
| I | 0.30 | 0.23 |
| J | 0.29 | 0.21 |
| K | 0.35 | 0.26 |
| L | 0.35 | 0.45 |
| M | 0.28 | 0.26 |
| N | 0.36 | 0.35 |

As can be seen from the table above, the compositions according to the present invention (A to H) make it possible to achieve at the same time a high wet peel strength and a good dry peel strength. Furthermore, even when the composition is devoid of an acid-modified compound (A, B, E, G, H), a high wet peel strength and a dry peel strength can still be achieved.

The invention claimed is:

1. A hot melt adhesive composition comprising a polymer component, the polymer component comprising:
    at least one linear styrene-butadiene-styrene block copolymer P having:
        a styrene content from 35 to 50% by weight;
        a styrene-butadiene diblock content from 50 to 80% by weight; and
        a viscosity of a 15% by weight toluene solution at 25° C. of 20 to 40 mPa·s;
    at least one styrene block copolymer other than a styrene-butadiene-styrene block copolymer, the styrene block copolymer comprising a styrene-isoprene-styrene block copolymer;
    wherein said styrene-butadiene-styrene block copolymer P is at a content from 10 to 40% by weight relative to the total weight of the polymer component.

2. The composition according to claim 1, wherein the styrene-butadiene-styrene block copolymer P is at a content from 10 to 35% by weight relative to the total weight of the polymer component.

3. The composition according to claim 1, wherein the at least one styrene block copolymer other than a styrene-butadiene-styrene block copolymer is a mixture of styrene-isoprene-styrene copolymer and a styrene block copolymer selected from the group consisting of styrene-butadiene, styrene-isoprene, styrene-isoprene-butadiene-styrene, styrene-ethylene-butylene-styrene, styrene-ethylene-butylene, styrene-ethylene-propylene-styrene, styrene-ethylene propylene, styrene-ethylene-ethylene-propylene-styrene copolymers, and mixtures thereof.

4. The composition according to claim 1, wherein the at least one styrene block copolymer other than a styrene-butadiene-styrene is a styrene-isoprene-styrene block copolymer.

5. The composition according to claim 1, wherein the at least one styrene block copolymer other than a styrene-butadiene-styrene is at a content from 0.1 to 60% by weight relative to the total weight of the polymer component.

6. The composition according to claim 1 wherein the polymer component comprises:
   from 40 to 85 wt. % of at least one styrene-butadiene-styrene block copolymer different from the styrene-butadiene-styrene block copolymer P;
   from 1 to 20 wt. % of a styrene-isoprene-styrene block copolymer.

7. The composition according to claim 1 being devoid of a resin, wax or oil modified by an unsaturated polycarboxylic acid, anhydride or ester.

8. The composition according to claim 1, having a viscosity from 1,000 to 30,000 mPa·s at a temperature of 120° C.

9. The composition according to claim 1, wherein the total amount of polymer component is from 10% to 80% by weight relative to the total weight of the hot melt adhesive composition.

10. The composition according to claim 1, further comprising from 45 to 75% of a tackifying resin relative to the total weight of the composition, and/or from 5 to 25% of a plasticizer relative to the total weight of the composition, and/or from 0.1 to 5% of a stabilizer relative to the total weight of the composition, and/or from 0 to 30% of a wax relative to the total weight of the composition.

11. An adhesive or a coating comprising the composition according to claim 1, wherein the adhesive is used for bonding two substrates together, or the coating is used on the surface of a substrate.

12. An article comprising at least one interior or exterior surface coated with the hot melt adhesive composition of claim 1.

13. The article of claim 12, wherein the interior or exterior surface is a nonwoven fabric.

14. The article according to claim 12, wherein the article is selected from the group consisting of a disposable diaper, disposable training pants, a feminine sanitary napkin, an adsorbent pad, a surgical mask, and a surgical coat.

15. The hot melt adhesive composition of claim 1, wherein the at least one styrene-butadiene-styrene block copolymer P has:
   a styrene content from 40 to 45% by weight; and
   a styrene-butadiene diblock content from 60 to 70% by weight.

16. The hot melt adhesive composition of claim 1, wherein the polymer component comprises:
   from 40 to 85 wt. % of at least one styrene-butadiene-styrene block copolymer different from the styrene-butadiene-styrene block copolymer P; and
   from 5 to 15 wt. % of a styrene-isoprene-styrene block copolymer.

17. The hot melt adhesive composition of claim 1, wherein the at least one styrene block copolymer other than a styrene-butadiene-styrene block copolymer is a mixture of linear styrene-isoprene-styrene copolymer and styrene-isoprene copolymer.

* * * * *